United States Patent
Harvey

[15] 3,665,832
[45] May 30, 1972

[54] MOLDED PLASTIC BELLOWS

[72] Inventor: Donald M. Harvey, Rochester, N.Y.

[73] Assignee: Eastman Kodak Company, Rochester, N.Y.

[22] Filed: May 1, 1970

[21] Appl. No.: 33,678

[52] U.S. Cl. ............................................................95/39
[51] Int. Cl. .......................................................G03b 17/04
[58] Field of Search...........................................95/39; 220/8

[56] References Cited

UNITED STATES PATENTS

| 2,880,902 | 4/1959 | Owsen | 95/39 X |
| 2,143,125 | 1/1939 | Headlee | 95/39 |
| 598,676 | 2/1898 | Lochmann | 220/8 X |

*Primary Examiner*—Samuel S. Matthews
*Assistant Examiner*—Russell E. Adams, Jr.
*Attorney*—Robert W. Hampton and J. Addison Mathews

[57] ABSTRACT

A one-piece molded plastic bellows particularly suited for use in a photographic camera comprises a plurality of relatively rigid telescoping sleeves joined in lighttight relation to one another by integral flexible membranes which define the relative positions of the sleeves when the bellows is extended.

10 Claims, 6 Drawing Figures

Patented May 30, 1972
3,665,832
2 Sheets-Sheet 1
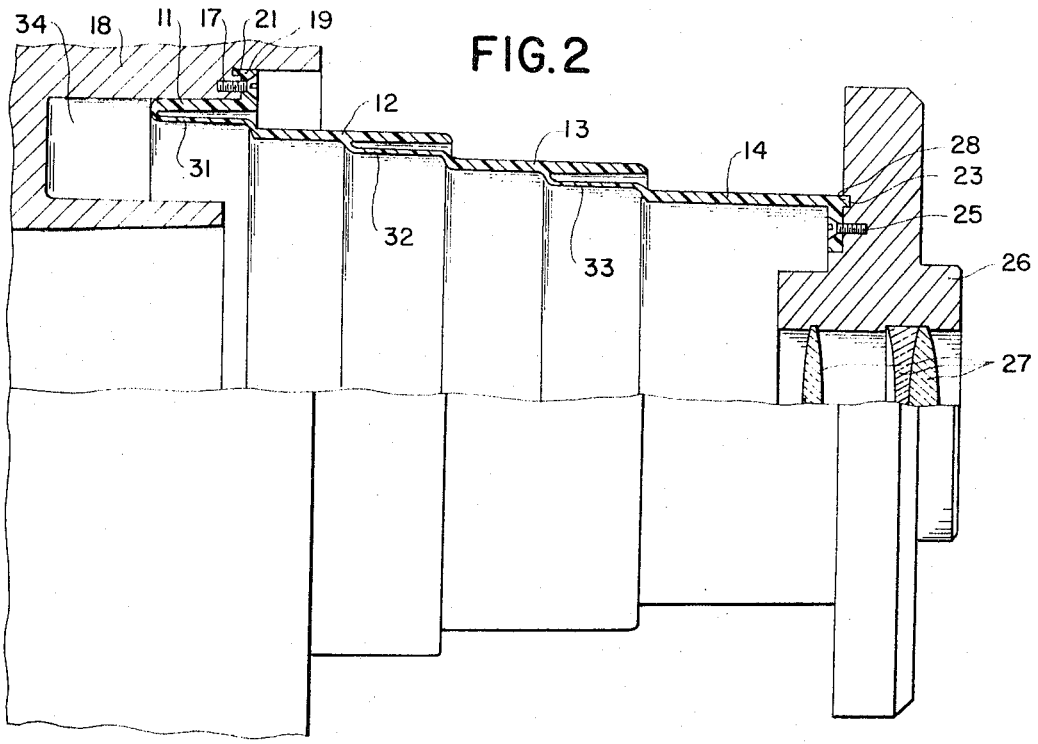
FIG. 2
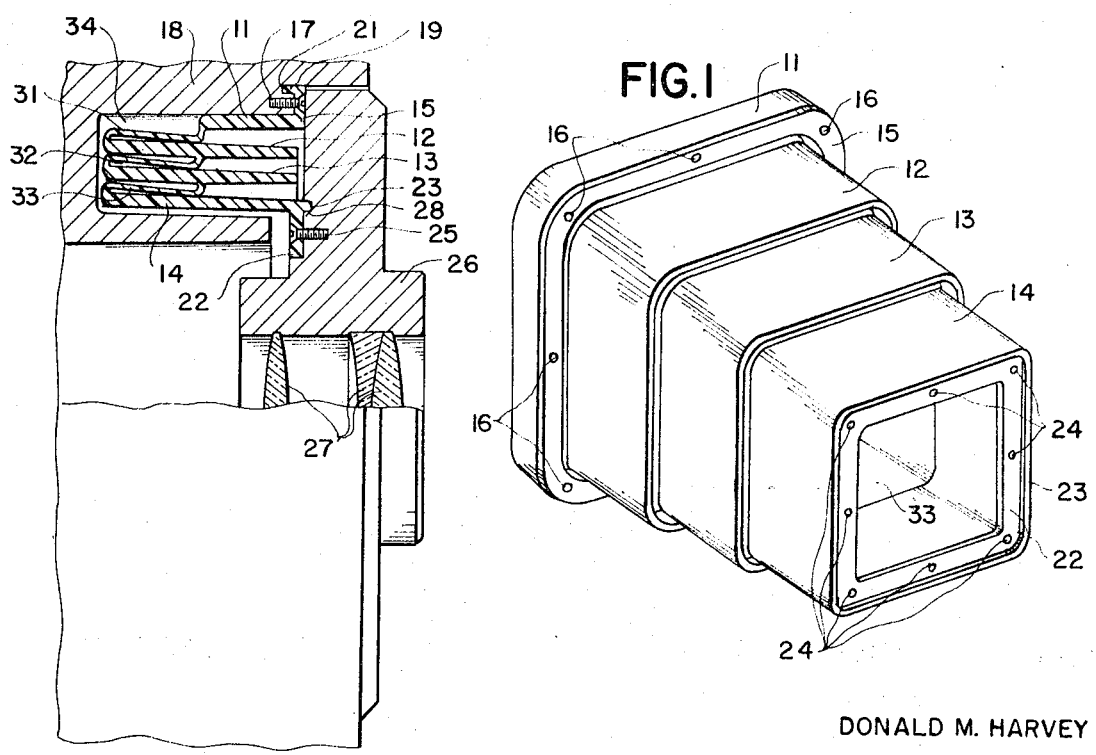
FIG. 3
FIG. 1
DONALD M. HARVEY
INVENTOR.
BY J. Adding Mathews
Robert W Hampton
ATTORNEYS

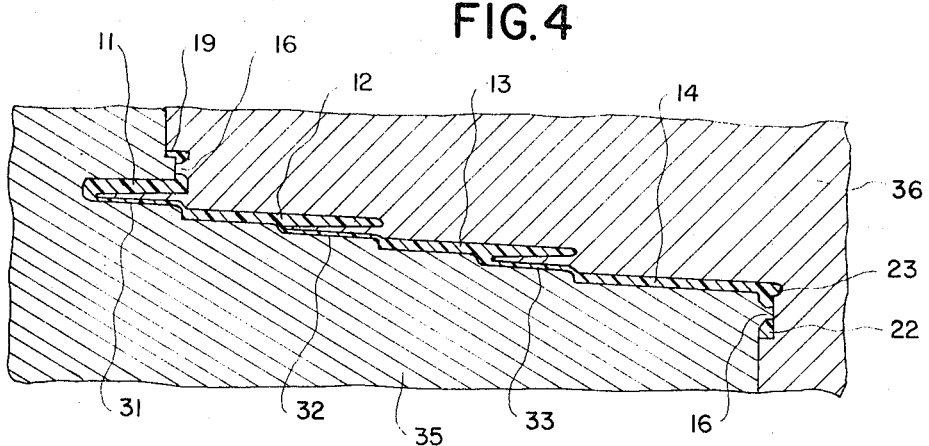
FIG. 4
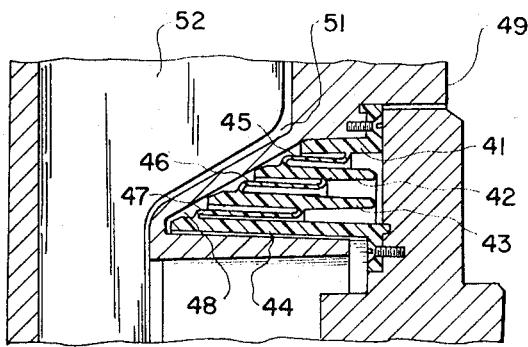
FIG. 5
FIG. 6

MOLDED PLASTIC BELLOWS

BACKGROUND OF THE INVENTION

1. Field of the Invention

The present invention relates to bellows particularly suited for use in photographic cameras and more specifically to one-piece molded plastic bellows.

2. Description of the Prior Art

The use of a collapsible bellows to provide lighttight cooperation between a camera housing and an extendable and retractable lens and shutter assembly is almost as old as the art of photography itself. The most common type of bellows heretofore employed for that purpose has been of generally rectangular pyramid shape comprising pleated wall members which fold together in accordian fashion to allow the bellows to be collapsed. Generally, such bellows are made by the relatively expensive process of cementing stiffening members to a piece of flexible opaque material which is then folded and formed into a rectangular tube to provide the finished bellows. Recently, various proposals have been made for producing an analogous accordian type bellows out of plastic material in a single molding or vacuum forming operation, thereby substantially eliminating the costly fabrication procedures just described. Even if such a technique is entirely successful, however, the resulting bellows inherently has the same familiar pleated appearance because the still wall sections must be flexibly joined together along substantially straight edges thereof in order to be folded relative to each other. Consequently, this improvement provides the stylist with relatively little opportunity to deviate from the stereotype appearance of this major visible element of the camera.

Another type of camera bellows comprises a plurality of rigid bellows sections which telescope into one another to allow the lens and shutter assembly to be extended and retracted Since these sections are slidably movable relative to each other rather than being hinged together, such a construction avoids the conventional pleated bellows appearance and also allows the designer to curve and blend the bellows walls and corners for styling purposes. However, such previously known telescoping bellows have included a plurality of separate relatively elaborate metal sections which must accurately mate and interlock with each other to provide labyrinth light barriers between the adjacent sections. Consequently, this mode of construction is not economically competitive with conventional types of bellows because of the cost of the telescoping components and the attendant assembly thereof.

SUMMARY OF THE INVENTION

The present invention allows the above-described advantages of a telescoping bellows to be achieved at relatively low cost by means of a one-piece molded plastic bellows comprising a plurality of relatively rigid telescoping sleeves joined in lighttight relation to one another by integral flexible membranes which also define the relative positions of the sleeves when the bellows is extended. Additionally, means are formed integrally with the bellows during the molding operation for connecting its opposite ends in lighttight cooperation with the camera housing and the lens and shutter assembly, thereby avoiding the need for any secondary bellows finishing operations.

Various means for practicing the invention and other advantages and novel features thereof will be apparent from the following detailed description of illustrative preferred embodiments of the invention, reference being made to the accompanying drawings in which like reference characters denote like elements.

BRIEF DESCRIPTION OF THE DRAWINGS

In the detailed description of the preferred embodiment of the invention presented below, reference is made to the accompanying drawings, in which:

FIG. 1 is a perspective illustration of a one-piece molded plastic bellows according to a preferred embodiment of the present invention;

FIG. 2 is a fragmentary partially cross-sectioned view of a camera incorporating a bellows of the type shown in FIG. 1, illustrating the bellows in open condition;

FIG. 3 corresponds to FIG. 2 and shows the bellows in its closed condition;

FIG. 4 is a fragmentary cross-sectional view showing the manner in which the bellows illustrated in the preceding Figures is molded in one piece;

FIG. 5 corresponds generally to FIG. 2 but illustrates an open camera provided with a bellows according to an alternate embodiment of the invention; and FIG. 6 shows the bellows illustrated in FIG. 5 in its closed condition.

DESCRIPTION OF THE PREFERRED EMBODIMENTS

FIGS. 1, 2 and 3 of the accompanying drawings depict an illustrative bellows according to the present invention comprising four progressively smaller generally rectangular tubular sleeves 11 through 14 located in coaxial telescoping relation to each other. A peripheral flange 15 extends outwardly from the front edge of the rearward tubular sleeve 11 and is provided with a plurality of countersunk holes 16 adapted to accommodate screws 17 which attach the bellows to a camera housing 18 partially depicted in FIGS. 2 and 3. A continuous rearwardly projecting lip 19 surrounds screw holes 16 in flange 15 and is received in a mating groove 21 in the camera housing to increase the rigidity of the rearward bellows sleeve and to provide a labyrinth light barrier between that sleeve and the housing. The forward bellows sleeve 14 is similarly provided at its open front end with an inwardly projecting collar 22 surrounded by a forwardly extending lip 23 and including countersunk screw holes 24. Screws 25 extend through holes 24 in collar 22 to attach tubular section 14 to the lens housing member 26 which carries the camera's objective lens 27 and a shutter mechanism, not shown. As is well known in the photographic art, the lens support member is mounted to the camera housing by an appropriate linkage, not shown, which allows it to be moved between its extended and retracted positions illustrated respectively in FIGS. 2 and 3. When the bellows is attached to the lens support member, lip 23 is received in mating engagement with a continuous slot 28 in that member to provide a lighttight connection. Rather than being mounted by screws or the like, the rearward and forward bellows sleeves could of course be cemented respectively to the housing and to the lens support member. Alternatively, lips 19 and 23 could be adapted to snap into clamping engagement with corresponding mating grooves in those elements of the camera, thereby simplifying the assembly of the camera by eliminating all additional attachment means.

Internally of the bellows, the tubular sleeves thereof are connected by three opaque flexible tubular membranes 31, 32 and 33, which provide perimetric light barriers between the sleeves. When the bellows is extended as shown in FIGS. 1 and 2, these membranes are relatively taut; thus maintaining the bellows sleeves in substantially coaxial alignment and preventing the adjacent sleeves from telescoping apart beyond one another. Upon retraction of the lens support member, the membranes are everted as shown in FIG. 3 to allow the bellows sleeves to be telescoped together within a storage recess 34 in the camera housing. It will be noted that the everted membranes are located in lateral alignment with the tubular sleeves of the collapsed bellows and therefore do not require the storage recess to be any deeper than is necessary to accommodate the length of the sleeves themselves. Although the illustrative bellows comprises only four telescoping sleeves, any number of sleeves obviously can be employed. Also, it should be observed that the thickness of the sleeves and membranes and the distance by which the sleeves are spaced laterally apart to accommodate the membranes is exaggerated in the drawings for illustrative purposes.

The entire bellows is preferably formed in one piece in a single operation by being molded out of an appropriate opaque plastic material that is relatively flexible and fatigue resistant, e.g. polypropylene or ethylene vinyl acetate. The manner in which the bellows is molded as a unitary structure will be immediately apparent to those skilled in the plastic art by reference to FIG. 4, which depicts the male and female mold members 35 and 36 employed for that purpose. In actual practice, each mold member would undoubtedly comprise a number of separately machined sections laminated together and provided with appropriate coolant passageways or the like, but such details have been omitted as being unnecessary to understanding the basic molding principle involved.

FIGS. 4 and 5 illustrate a bellows according to an alternate embodiment of the invention in which the four tubular bellows sleeves 41 through 44 are of progressively greater lengths and in which the three connecting light barrier membranes 45 through 47 are partially exposed to view when the bellows is open to provide a different esthetic appearance. As shown in FIG. 6, the variation in the length of the bellows sleeves increases the compactness of the camera by allowing the storage recess 48 in the corresponding camera housing 49 to avoid an internal housing compartment 51, the shape and size of which is dictated by a film magazine 52 or the equivalent.

From the foregoing, it should be readily apparent that the present invention provides an attractive and durable camera bellows at greatly reduced production cost and also substantially simplifies the assembly of the camera in which the bellows is installed. It should also be apparent that although the illustrative bellows is of generally square frontal configuration, with rounded corners, the invention affords a heretofore unavailable degree of design freedom that allows such a bellows to be of almost any tubular configuration. Furthermore, it should be appreciated that similar bellows could also be produced in accordance with the invention for purposes unrelated to photographic equipment.

The invention has been described in detail with particular reference to preferred embodiments thereof, but it will be understood that variations and modifications can be effected within the spirit and scope of the invention.

I claim:

1. A bellows comprising a plurality of relatively rigid opaque tubular sleeves adapted to telescope in first and second directions relative to each other for extending and collapsing said bellows, respectively, and a plurality of flexible opaque membranes connecting said tubular sleeves in adjacent lighttight relation, each of said membranes being dimensioned and attached to adjacent sleeves to limit telescoping of said sleeves in said first telescoping direction substantially to prevent any spacing between adjacent sleeves in said first telescoping direction, said membranes being adapted to evert to accommodate telescoping of said tubular sleeves relative to each other in said second direction.

2. A bellows according to claim 1 wherein said tubular sleeves and said membranes comprise a single piece of plastic material defining an integral bellows construction.

3. A bellows according to claim 1 wherein said tubular sleeves define different lengths in said first direction.

4. A bellows according to claim 2 for use with a camera, and wherein said tubular sleeves include rearwardmost and forwardmost tubular sleeves both having integral light barrier means for mating respectively with the camera to provide lighttight cooperation between said bellows and said camera.

5. A bellows according to claim 1 wherein said sleeves are extendable and said membranes limit said telescoping movement of said tubular sleeves relative to each other to maintain said sleeves in slightly overlapping relation to each other when said sleeves are extended.

6. A bellows according to claim 1 wherein said bellows has a collapsed condition and said membranes are located between said tubular sleeves in said collapsed condition to reduce said bellows to its minimum length.

7. A bellows according to claim 5 wherein said tubular sleeves define an interior chamber when extended, and said membranes are located internally of said tubular sleeves within said interior chamber and are enclosed by said tubular sleeves when said bellows is extended.

8. A bellows according to claim 1 wherein said tubular sleeves define a generally rectangle configuration with rounded corners.

9. A bellows comprising a plurality of relatively rigid opaque tubular sleeves arranged to telescope relative to each other between collapsed and extended conditions, and a plurality of flexible opaque tubular membranes connecting said tubular sleeves in lighttight relation, said tubular sleeves each including first and second ends and a central section, and said membranes each extending from one of said tubular sleeves to said central section of another of said tubular sleeves, said membranes being adapted to evert to accommodate telescoping of said tubular sleeves between said collapsed and extended conditions.

10. A bellows as claimed in claim 9, wherein said tubular sleeves define a telescoping axis about which said sleeves are concentric, and wherein said sleeves lie in closely adjacent relationship relative to each other in directions perpendicular to said telescoping axis in said extended condition to increase the structural rigidity of said bellows in said extended condition.

* * * * *